United States Patent [19]

Ohmori et al.

[11] Patent Number: 5,677,614

[45] Date of Patent: Oct. 14, 1997

[54] BATTERY CHARGER USING A CAR BATTERY AS A POWER SOURCE

[75] Inventors: Katuhiro Ohmori; Takahito Ishizuka, both of Hitachinaka; Koji Kanazawa, Fukushima-ken, all of Japan

[73] Assignee: Hitachi Koki Co., Ltd., Tokyo, Japan

[21] Appl. No.: 684,184

[22] Filed: Jul. 19, 1996

[30] Foreign Application Priority Data

Jul. 21, 1995 [JP] Japan ................................ 7-185549

[51] Int. Cl.[6] ........................................ H01M 10/46
[52] U.S. Cl. ........................................ 320/32; 320/39
[58] Field of Search ........................ 320/5, 8, 9, 12, 320/13, 21, 22, 29, 30, 31, 32, 39, 40, 48

[56] References Cited

U.S. PATENT DOCUMENTS

| | | | |
|---|---|---|---|
| 5,130,634 | 7/1992 | Kasai | 320/22 |
| 5,250,891 | 10/1993 | Glasgow | 320/31 |
| 5,321,347 | 6/1994 | Chien | 320/39 X |
| 5,350,995 | 9/1994 | Iketani | 320/15 |
| 5,363,312 | 11/1994 | Ninomiya | 320/48 X |
| 5,444,353 | 8/1995 | Shinohara et al. | 320/39 |

FOREIGN PATENT DOCUMENTS

| | | |
|---|---|---|
| 63-16290 | 5/1988 | Japan. |
| 1134944 | 9/1989 | Japan. |

*Primary Examiner*—Edward Tso
*Attorney, Agent, or Firm*—Sughrue, Mion, Zinn, Macpeak & Seas, PLLC

[57] ABSTRACT

In a battery charger of the type using a car battery as a power source for charging a rechargeable batter, when a low voltage state of the car battery continues for a first predetermined period of time, charging of the rechargeable battery will be interrupted. However, charging of the battery will be resumed when the voltage of the car battery reverts to a predetermined allowable voltage before expiration of a second predetermined period of time. If the low voltage state of the car battery continues for the second predetermined period of time, charging of the rechargeable battery is no longer performed.

12 Claims, 3 Drawing Sheets

BATTERY CHARGER USING A CAR BATTERY AS A POWER SOURCE

BACKGROUND OF THE INVENTION

1. Field of the Invention

The present invention relates to a battery charger of the type using a battery mounted on an automotive vehicle (hereinafter referred to as "car battery") as a power source for charging a battery.

2. Description of the Prior Art

A conventional battery charger of the type using a car battery as a power source is provided with a computer-controlled anti-overdischarge device which stops charging the battery when the source voltage, that is, the voltage of the car battery, falls below a lower limit value. This anti-overdischarge device is necessary to preserve a minimum capacity of the car battery for starting the car engine.

The operation of the computer-controlled anti-overdischarge device will be described while referring to the flowchart shown in FIG. 1. In the following description, Si represents a step number where i is an integer.

The battery charger is powered when connected to a cigarette lighter socket (POWER ON), whereupon initial settings of a microcomputer are executed (S1). After the initial settings are complete, the power source voltage from the cigarette lighter socket is inputted to the microcomputer via a power source voltage monitoring circuit. The microcomputer determines whether or not the power source voltage is higher than 11.2 volts (S2), that is, a voltage to be preserved for starting the engine. When the determination made in S2 indicates that the power source voltage is equal to or lower than 11.2 volts (S2: NO), a display indicates that the power source voltage is unsatisfactory, whereupon the routine returns to S2. When the determination made in S2 indicates that the power source voltage is higher than 11.2 volts (S2: YES), the microcomputer checks whether the battery is connected to the charger (S4). When the battery is not connected to the charger (S4: NO), the routine returns to S2. When the battery is connected to the battery charger (S4: YES), the battery starts charging (S5). Thereafter, the microcomputer again determines whether the power source voltage is higher than 11.2 volts or not (S6). When the power source voltage is higher than 11.2 volts (S6: YES), it is determined that the power source voltage is normal and so supply of the charging current to the battery 3 is continued until the battery is fully charged. When the power source voltage is equal to or lower than 11.2 volts (S6: NO), a display alerts the operator that the voltage of the power source is too low (S7) and at the same time stops the battery charger from further charging the battery (S8).

The above-described anti-overdischarge device determines that the power source voltage is unacceptably low even if the low voltage duration is temporary. Specifically, when the power source voltage is temporarily lowered when a fan motor or a power window of the car is turned on, the anti-overdischarge device stops charging the battery. Therefore, the battery will not be fully charged.

SUMMARY OF THE INVENTION

In view of the foregoing, it is an object of the present invention to provide an anti-overdischarge device which allows a battery charger to continue charging even if a voltage of the car battery is temporarily lowered below a lower limit value.

To achieve the above and other objects, there is provided a battery charger including charging means, voltage monitoring means, and interruption means. The charging means is provided for charging a rechargeable battery using a car battery. The voltage monitoring means monitors the voltage of the car battery and outputs a voltage signal indicative of the voltage of the car battery. The interruption means is provided for interrupting the charging means from continuously charging the rechargeable battery when the voltage signal output from the voltage monitoring means indicates that a low voltage state of the car battery continues for a first predetermined period of time. The car battery is in the low voltage state when the voltage of the car battery is equal to or lower than a predetermined lower limit voltage. It is preferable that a possible lowest voltage for starting a car engine is selected as the predetermined lower limit voltage of the car battery.

Charge resume means is further provided for resuming charging of the rechargeable battery when the voltage of the car battery returns to a predetermined allowable voltage during interruption of the charging means. The predetermined allowable voltage is preferably set to larger than the predetermined lower limit voltage. Further, the interruption of the charging means continues for a second predetermined period of time.

Charge stop means is further provided for stopping charging of the rechargeable battery without further charging the rechargeable battery after the interruption of the charging means when the interruption of the charging means continues for a second predetermined period of time.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENT

A preferred embodiment of the present invention will be described with reference to FIGS. 2 and 3.

Figure 1:
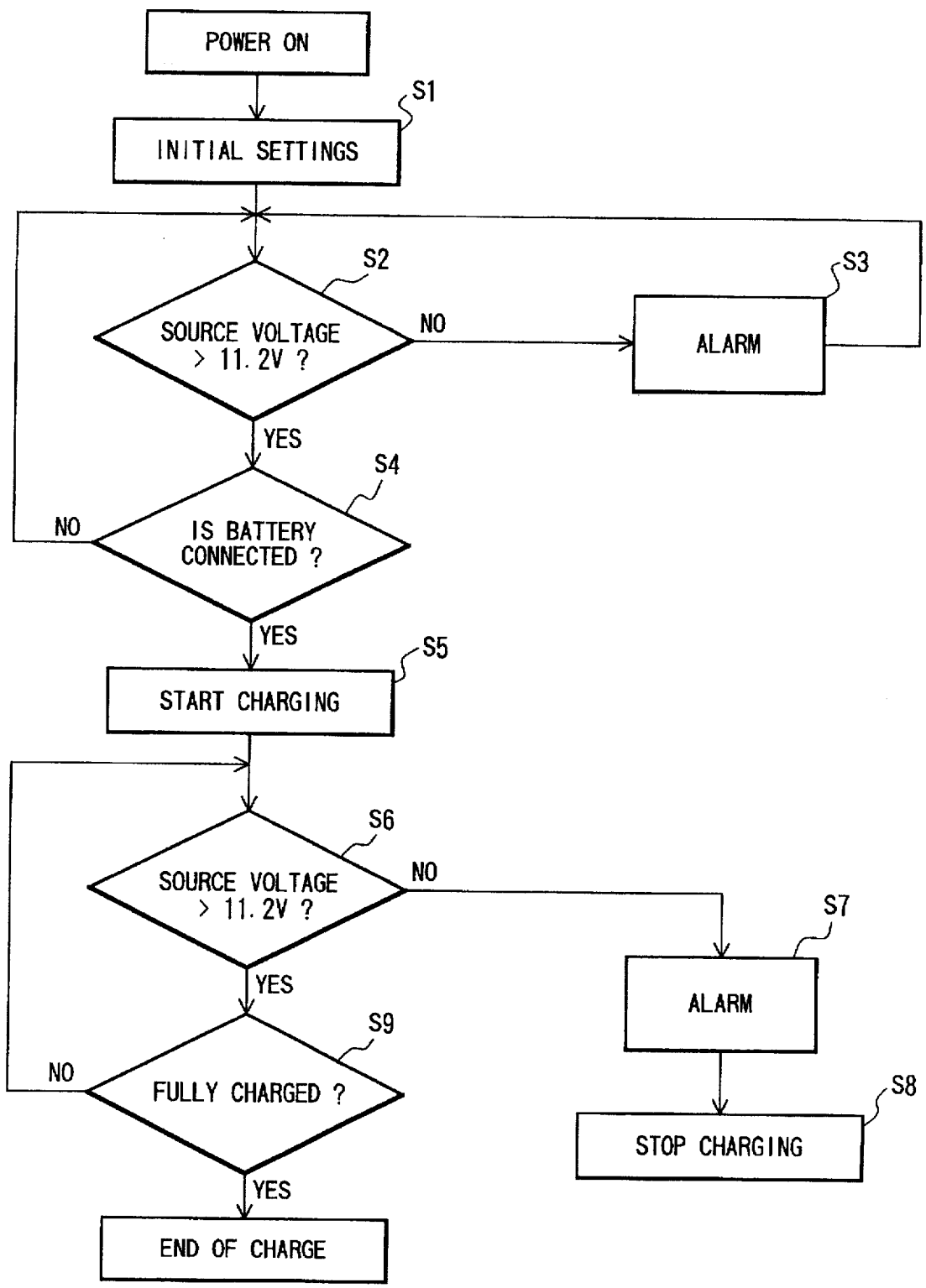
FIG. 1 is a flowchart illustrating an operation of a conventional battery charger using a car battery as a charge source.
Figure 2:
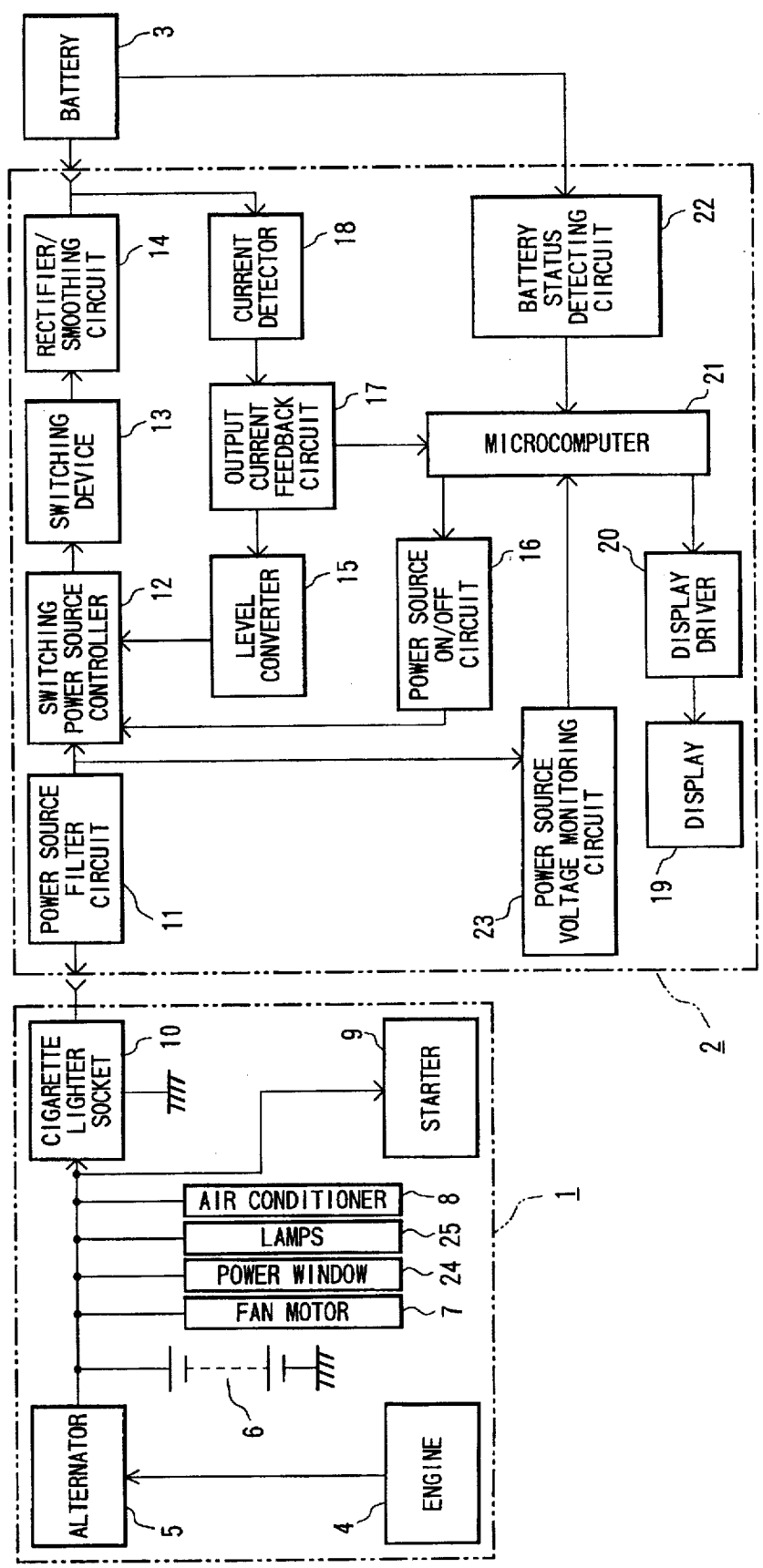
FIG. 2 is a circuit block diagram showing a battery charger according to the present invention.
Figure 3:
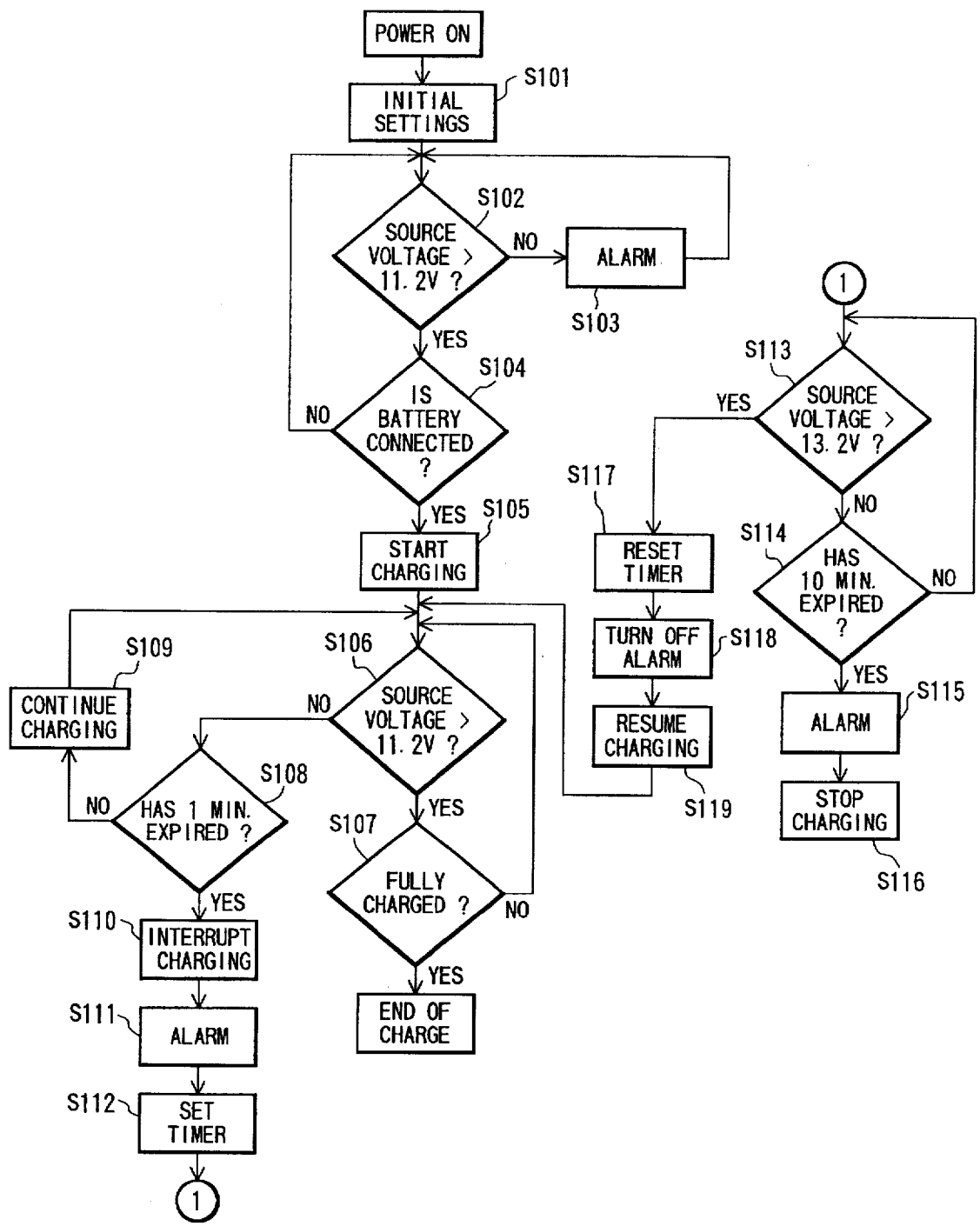
FIG. 3 is a flowchart illustrating an operation of a battery charger according to one embodiment of the present invention.

As shown in FIG. 2, a battery charger 2 has an input connected to a vehicle's electrical system 1 including a car battery 6, and an output connected to a rechargeable battery 3. The electrical system 1 of the vehicle includes an alternator 5 for converting mechanical energy generated by an engine 4 into electrical energy; and the car battery 6 for supplying electrical currents to a fan motor 7, a power window 24, lamps 25, an air conditioner 8, a starter 9, and other electrical equipment. The electrical system 1 further includes a cigarette lighter socket 10 connected to the battery charger 2.

The battery charger 2 includes a switching power source controller 12 for supplying a constant charge current to the battery 3, a switching device 13, a rectifier/smoothing circuit 14, a level convertor 15, an output current feedback circuit 17, a current detector 18, a battery status detecting circuit 22 for detecting a voltage and a temperature of the battery 3, a power source ON/OFF circuit 16 for turning the battery charger 2 ON and OFF, a microcomputer 21, a power source voltage monitoring circuit 23 for monitoring the power source voltage, and a display driver 20 for displaying information regarding the status of the battery charger 2 on a display 19.

Operation of the battery charger 2 will next be described with reference to the flowchart shown in FIG. 3.

The battery charger 2 is powered when connected to the cigarette lighter socket 10 (POWER ON), whereupon initial settings of the microcomputer 21 are executed (S101). After the initial settings are complete, the power source voltage from the cigarette lighter socket 10 is inputted to the microcomputer 21 via the power source filter circuit 11 and the power source voltage monitoring circuit 23. The microcomputer 21 determines whether or not the power source voltage is higher than 11.2 volts (S102), that is, a voltage to be preserved for starting the engine. When the determination made in S102 indicates that the power source voltage is equal to or lower than 11.2 volts (S102: NO), the display 19 indicates that the power source voltage is abnormal (S103), whereupon the routine returns to S102. When the determination made in S102 indicates that the power source voltage is higher than 11.2 volts (S102: YES), the microcomputer 21 checks whether the battery 3 is connected to the battery charger 2 (S104). When the battery 3 is not connected to the battery charger 2 (S104: NO), the routine returns to S102. When the battery 3 is connected to the battery charger 2 (S104: YES), the battery starts charging (S105). Thereafter, the microcomputer 21 again determines whether the power source voltage is higher than 11.2 volts or not (S106). When the power source voltage is higher than 11.2 volts (S106: YES), it is determined that the power source voltage is normal and so supply of the charging current to the battery 3 is continued. Next, whether or not the battery 3 is fully charged is determined (S107). If the battery 3 has not yet been fully charged, the routine returns to S106. When it is determined that the battery 3 is fully charged (S107: YES), charging of the battery 3 is ended. The battery is determined to be fully charged when, for example, the battery voltage is lowered by a predetermined voltage from a peak voltage attained during the charging procedure.

When the decision made in S106 is negative, that is, when it is determined that the power source voltage is equal to or lower than 11.2 volts (S106: NO), the microcomputer 21 monitors the duration of the low voltage condition of the car battery 6. When the low voltage duration has continued for one minute, the routine proceeds to S110, whereas when the low voltage duration ends before expiration of one minute, the routine proceeds to S109. Typically, energization of the fan motor 7 and actuation of the power window 24 will not continue for more than one minute. Therefore, in these cases, the charging procedure is continued (S109) and the routine returns to S106. When the decision made in S108 is affirmative (S108: YES), that is, when the low voltage duration has continued for one minute, the charging procedure is interrupted (S110) and the display 19 is lit to alert the operator of the interruption of charging (S111). Thereafter, a timer, which is provided internally to the microcomputer 21 and is used for measuring a duration of time that the battery 3 is not charged, is set to 10 minutes (S112). Then, the microcomputer 21 determines whether or not the source voltage reverts to a voltage greater than 13.2 volts, which will hereinafter be referred to as "a revert voltage" (S113). If the decision made in S113 indicates that the source voltage has not yet reached the revert voltage (S113: NO), by referring to the timer it is determined whether or not ten minutes have expired since charging was interrupted (S114).

If ten minutes have not yet expired (S114: NO), the routine returns to S113. S112 to S114 are provided to confirm that the power source voltage has reverted to a voltage capable of charging the battery 3. When large load components such as the air conditioner 8 and the lamps 25 are turned off, the power source voltage may revert to a voltage above 13.2 volts.

When the power source voltage is greater than 13.2 volts (S113: YES), the timer is reset (S117) and the display 19 is turned off (S118) to cancel the alarm, whereupon charging the battery 3 is resumed (S119). Thereafter, the routine returns to S106. When the source voltage does not return to the revert voltage, 13.2 volts, even after expiration of ten minutes from the start of charge interruption, the display 19 is lit to alert that the charging is stopped meaning that the charging of the battery 3 will no longer be performed (S115). This charge stoppage is maintained until the battery charger 2 is again powered on and the subsequent initial settings are executed.

As described, the battery charger according to the present invention does not stop charging the battery unless the voltage drop of the car battery continues after a predetermined duration of time expires. Therefore, charging of the battery can be continued until the battery is fully charged while monitoring the capacity of the car battery. When large load components are used for a long time, charging of the battery is interrupted for a while but is resumed when the voltage of the car battery returns to a level capable of charging the battery because the large load components were turned off. Accordingly, the car battery will not be overdischarged and the battery to be charged can be fully charged.

What is claimed is:

1. A battery charger comprising:

charging means for charging a rechargeable battery using a car battery supplying voltage;

voltage monitoring means for monitoring the voltage of the car battery and outputting a voltage signal indicative of the voltage of the car battery; and interruption means for interrupting said charging means from continuously charging the rechargeable battery when the voltage signal output from said voltage monitoring means indicates that a low voltage state of the car battery continues for a first predetermined period of time, the car battery being in the low voltage state when the voltage of the car battery is not higher than a predetermined lower limit voltage.

2. A battery charger according to claim 1, wherein possible lowest voltage for starting a car engine is selected as the predetermined lower limit voltage of the car battery.

3. A battery charger according to claim 2, further comprising charge resume means for resuming charging of the rechargeable battery when the voltage of the car battery returns to a predetermined allowable voltage during interruption of said charging means.

4. A battery charger according to claim 3, wherein the predetermined allowable voltage is larger than the predetermined lower limit voltage.

5. A battery charger according to claim 4, wherein the interruption of said charging means continues for a second predetermined period of time.

6. A battery charger according to claim 3, further comprising charge stop means for stopping charging of the rechargeable battery without further charging the rechargeable battery after the interruption of said charging means when the interruption of said charging means continues for a second predetermined period of time.

7. A battery charger comprising:

charging means for charging a rechargeable battery, said charging means having an input connectable to a car battery supplying voltage and an output connectable to the rechargeable battery;

first voltage monitoring means for monitoring the voltage of the car battery and for outputting a first voltage signal indicative of the voltage of the car battery;

detecting means for detecting, when the first voltage signal output from said first voltage monitoring means is higher than a first predetermined voltage, that the rechargeable battery is connected to the output of said charging means, wherein said charging means starts charging the rechargeable battery when said detecting means detects that the rechargeable battery is connected to the output of said charging means;

second voltage monitoring means for monitoring the voltage of the car battery after start of charging of the rechargeable battery and for outputting a second voltage signal indicative of the voltage of the car battery;

first time measuring means for measuring a first predetermined time duration of the second voltage signal having voltage not higher than the first predetermined voltage; and interrupting means for interrupting said charging means from continuously charging the rechargeable battery when said first time measuring means indicates expiration of the first predetermined time duration.

8. A battery charger according to claim 7, further comprising first alarming means for alarming that the car battery is in a low voltage status indicating that the voltage of the car battery is not higher than the first predetermined voltage.

9. A battery charger according to claim 8, further comprising:

second time measuring means for measuring a second predetermined time duration starting from the interruption of said charging means;

third voltage monitoring means for monitoring the voltage of the car battery after start of the interruption of said charging means and for outputting a third voltage signal indicative of the voltage of the car battery; and charge resume means for resuming charging of the rechargeable battery when the third voltage signal returns to a second predetermined voltage.

10. A battery charger according to claim 9, wherein said first alarming means stops alarming when said charge resume means resumes charging of the rechargeable battery.

11. A battery charger according to claim 10, further comprising charge stop means for stopping charging of the rechargeable battery without further charging the rechargeable battery after the interruption of said charging means when said second time measuring means indicates expiration of the second predetermined time duration.

12. A battery charger according to claim 10, further comprising second alarming means for alarming that the charging of the rechargeable battery will no longer be continued.

* * * * *